(12) United States Patent
Hassett

(10) Patent No.: US 7,022,235 B2
(45) Date of Patent: Apr. 4, 2006

(54) WASTEWATER BIOLOGICAL TREATMENT SYSTEM AND METHOD THEREFOR

(75) Inventor: Alan F. Hassett, Berwyn, PA (US)

(73) Assignee: The White Oak Partnership, L.P., Berwyn, PA (US)

( * ) Notice: Subject to any disclaimer, the term of this patent is extended or adjusted under 35 U.S.C. 154(b) by 95 days.

(21) Appl. No.: 10/663,211

(22) Filed: Sep. 16, 2003

(65) Prior Publication Data

US 2004/0112809 A1 Jun. 17, 2004

Related U.S. Application Data

(60) Provisional application No. 60/427,507, filed on Nov. 18, 2002, provisional application No. 60/411,773, filed on Sep. 17, 2002.

(51) Int. Cl.
*C02F 3/00* (2006.01)

(52) U.S. Cl. .................. 210/620; 210/747; 210/150; 210/170; 210/532.2; 405/43; 405/50; 134/21; 134/22.11

(58) Field of Classification Search .............. 210/617, 210/618, 620, 747, 150, 151, 170, 532.2; 134/21, 22.11, 22.12; 405/43, 44, 45, 50
See application file for complete search history.

(56) References Cited

U.S. PATENT DOCUMENTS

| | | | | |
|---|---|---|---|---|
| 3,600,225 A | * | 8/1971 | Parmelee | 134/22.12 |
| 3,658,589 A | * | 4/1972 | Shaddock | 134/21 |
| 3,875,056 A | | 4/1975 | Inglis | |
| 3,925,206 A | | 12/1975 | Dea | |
| 4,188,154 A | * | 2/1980 | Izatt | 405/43 |
| 4,230,578 A | | 10/1980 | Culp et al. | |
| 4,369,438 A | | 1/1983 | Wilhelmi | |
| 4,808,039 A | | 2/1989 | Fischer | |
| 4,850,745 A | | 7/1989 | Hater et al. | |
| 4,922,234 A | | 5/1990 | Murphy | |
| 4,948,295 A | * | 8/1990 | Pramsoler | 405/44 |
| 5,022,786 A | | 6/1991 | Philo | |
| 5,054,961 A | | 10/1991 | Sherman | |
| 5,080,528 A | | 1/1992 | Ressi di Cervio | |
| 5,246,309 A | | 9/1993 | Hobby | |
| 5,256,834 A | | 10/1993 | Gehring | |
| 5,283,569 A | | 2/1994 | Nelson | |

(Continued)

OTHER PUBLICATIONS

Fenn, Donna, "Rules of Engagement", Inc., pp. 48-53, (Jan. 1997).

(Continued)

*Primary Examiner*—Christopher Upton
(74) *Attorney, Agent, or Firm*—Akin Gump Strauss Hauer & Feld, LLP

(57) ABSTRACT

A biological treatment system, including a wastewater system drain field and at least one perforated distribution pipe located within the drain field and adapted to receive effluent. At least one perforated outer pipe surrounds the at least one distribution pipe to receive effluent from the at least one distribution pipe and to dispense the effluent to the drain field after it has been biologically treated in the at least one outer pipe. The system also includes a method of biological treatment comprising the steps of supplying effluent to at least one vessel positioned within a wastewater drain field; delivering gas to the at least one vessel to interact with the effluent such that the effluent experiences aerobic biological treatment; and passing biologically treated effluent from the at least one vessel to the wastewater drain field.

28 Claims, 6 Drawing Sheets

U.S. PATENT DOCUMENTS

| | | | |
|---|---|---|---|
| 5,310,280 | A | 5/1994 | Hara |
| 5,342,144 | A | 8/1994 | McCarthy |
| 5,345,034 | A | 9/1994 | Corey |
| 5,361,930 | A | 11/1994 | Perry |
| 5,382,363 | A | 1/1995 | Boylen |
| 5,383,974 | A | 1/1995 | Johnson |
| 5,435,666 | A | 7/1995 | Hassett et al. |
| 5,516,229 | A | 5/1996 | Atchley et al. |
| 5,520,481 | A | 5/1996 | Atchley et al. |
| 5,522,672 | A | 6/1996 | Moore |
| 5,549,415 | A | 8/1996 | Evans |
| 5,575,304 | A | 11/1996 | Hassett |
| 5,588,490 | A | 12/1996 | Suthersan et al. |
| 5,660,500 | A | 8/1997 | Marsden, Jr. et al. |
| 5,702,593 | A | 12/1997 | Horsley et al. |
| 5,707,527 | A | 1/1998 | Knutson et al. |
| 5,733,064 | A | 3/1998 | Takada et al. |
| 5,772,361 | A | 6/1998 | Gavin |
| 5,788,409 | A | 8/1998 | Johnson |
| 5,810,510 | A | 9/1998 | Urriola |
| 5,827,010 | A | 10/1998 | Hassett |
| 5,829,916 | A | 11/1998 | Evans |
| 5,863,151 | A | 1/1999 | Chapotelle |
| 5,909,982 | A | 6/1999 | Takada et al. |
| 5,927,898 | A | 7/1999 | Gavin |
| 5,951,203 | A | 9/1999 | Laak |
| 6,095,718 | A | 8/2000 | Bohnhoff |
| 6,227,396 | B1 | 5/2001 | Small |
| 6,270,661 | B1 * | 8/2001 | Jowett .................. 210/532.2 |
| 6,303,033 | B1 * | 10/2001 | Malone et al. ............. 210/170 |
| 6,336,770 | B1 | 1/2002 | Evans |
| 6,464,865 | B1 * | 10/2002 | Tipton et al. ............... 210/170 |
| 6,821,424 | B1 * | 11/2004 | Branz ....................... 210/151 |
| 2001/0030151 | A1 | 10/2001 | Tipton et al. |

OTHER PUBLICATIONS

"Why dig a hole and fill it up with stone . . . when you can dig a hole and leave it open!", Infiltrator Systems, Inc., (1996).

ISSZT "Technology Description and Case Studies", Technology Briefing, (Sep. 1996).

Hassett, A.F., "Sewers of the Future", Conference in Houston, Texas at the Hyatt Regency Houston, (Sep. 1995).

"Onsite Wastewater Treatment Systems Manual", Office of Water, Office of Research and Development, U.S. EPA, (Feb. 2002).

* cited by examiner

WASTEWATER BIOLOGICAL TREATMENT SYSTEM AND METHOD THEREFOR

CROSS REFERENCE TO RELATED APPLICATIONS

This application claims the benefit of U.S. Provisional Patent Application No. 60/411,773, filed Sep. 17, 2002 and U.S. Provisional Patent Application No. 60/427,507, filed Nov. 18, 2002 which are hereby incorporated herein by reference in their entirety.

BACKGROUND OF THE INVENTION

Traditionally, conventional onsite wastewater treatment systems (OWTSs) have consisted primarily of a septic tank and a soil absorption field, also known as a subsurface wastewater infiltration system (SWIS). Conventional systems work well if they are: installed in areas with appropriate soils and hydraulic capacities; designed to treat the incoming waste load to meet public health, ground water, and surface water performance standards; installed properly; and maintained to ensure long-term performance. These criteria, however, are often not met.

Over the past century developing countries have witnessed an explosion in sewage treatment technology and widespread adoption of centralized wastewater collection and treatment services. Scientists, engineers, and manufacturers in the onsite wastewater treatment industry have also developed a wide range of alternative technologies designed to address the shortcomings of traditional conventional systems as well as increased hydraulic loads and water contamination. These "alternative" onsite treatment technologies are more complex than conventional systems and incorporate pumps, recirculation piping, aeration, and other features. As such, alternative technologies are applied to the treatment train beyond the septic tank and often provide environments (e.g., recirculating sand filters, peat-based systems, package aeration units) that promote additional biological treatment.

Accurate characterization of raw wastewater, including daily volumes, rates of flow, and associated pollutant load, is critical for effective alternative treatment system design. Determining treatment system performance requirements, selecting appropriate treatment processes, designing the alternative treatment system, and operating the system depends on an accurate assessment of the wastewater to be treated and the effluent quality desired.

There are basically two types of onsite wastewater systems—residential and nonresidential. The required hydraulic capacity for an OWTS can be determined initially from an estimated wastewater flow. For example, the average daily wastewater flow from typical residential dwellings can be estimated from indoor water use in the home. However, maximum and minimum flows, as well as instantaneous peak flow variations, are necessary factors in properly sizing and designing system components. Alternative onsite treatment system designs vary considerably and are based largely on the type of establishment under consideration. Therefore, reliable data on existing and projected flows must be used if onsite systems are to be designed properly and cost-effectively. Accurate wastewater characterization data and appropriate factors of safety to minimize the possibility of system failure are required elements of a successful alternative wastewater system design. All OWTSs should be designed to accept and process hydraulic flows from residential or nonresidential wastewaters while providing necessary pollutant removal efficiency to achieve performance goals.

The three primary components of a conventional OWTS are: the soil beneath the SWIS; the SWIS (also called a leach field, drain field or infiltration trench); and, the septic tank. The SWIS is the interface between the engineered system components and the receiving ground water environment. SWISs provide both dispersal and treatment of the applied wastewater. Typically, wastewater is transported from the infiltration system through several different soil zones, which can act as fixed-film bisectors, where oxygen in the soil may or may not satisfy the oxygen demand generated by the microorganisms degrading the treated wastewater. If sufficient oxygen is not present, the aerobic metabolic processes of the microorganisms (biomass) can be reduced or halted and both treatment and infiltration of the wastewater can be adversely affected.

The method and pattern of wastewater distribution in a SWIS are important design considerations. Uniform distribution aids in maintaining unsaturated flow below the infiltration surface which results in wastewater retention times in the soil that are sufficiently long to effect treatment and promote subsoil reaeration. As a result, uniform distribution design can provide more complete utilization of the infiltration surface.

While many different SWIS designs and configurations are used, all incorporate soil infiltrative surfaces that are located in buried excavations. Typically, a SWIS utilizes perforated pipe to distribute the wastewater over the infiltration surface. A porous medium of aggregate, such as gravel or crushed rock, is often placed in the excavation below and around the perforated distribution pipe to support the pipe and spread the localized flow from the distribution pipe across the excavation cavity. However, the porous aggregate may be substituted by graveness or "aggregate-free" system components.

Gravelless systems are prominent in the United States today taking on many designs, including open-bottomed chambers, fabric-wrapped pipe, and synthetic materials such as expanded polystyrene foam chips. Many graveness systems use large-diameter corrugated plastic tubing covered with permeable nylon filter fabric not surrounded by gravel or rock. Other graveness systems use leaching chambers that consist of trenches or beds and one or more distribution pipes or open-bottomed plastic chambers.

Several different biological treatment processes exist for reducing biochemical oxygen demand (BOD) and total suspended solids (TSS) from septic tank effluent to meet higher effluent standards. The activated sludge process is an aerobic suspended-growth process that maintains a relatively high population of biomass by recycling concentrated biomass back to the treatment process. The biomass converts soluble and colloidal biodegradable organic matter and some inorganic compounds into cell mass and metabolic end products. The biomass is separated from the wastewater by settling in a clarifier and recycled or removed to a sludge handling process. Preliminary treatment to remove settleable solids and floatable materials is usually provided by a septic tank or other primary treatment devices.

Alternatively, fixed-film systems are biological treatment processes that employ a medium of natural or synthetic solid material that will support biomass on its surface and within its porous structure. At least two types of fixed-film systems have been employed—those in which the medium is held in place and stationary relative to fluid flow (trickling filter) and those in which the medium is in motion relative to the wastewater (e.g., rotating biological disk). A third system, which is the focus of the present invention, includes dual-process systems that encompass both fixed and suspended biomass together or in series.

The state of the art with respect to the present invention is presented in U.S. E.P.A. Office of Water, Office of Research and Development, "Onsite Wastewater Treatment Systems Manual" (February 2002) which is hereby incorporated by reference in its entirety and restated, in part, above. Importantly, improvements can be made to suspended-growth processes, including adding surfaces where biomass can attach and grow, such that the system can be categorized as a dual-process or fixed-film/suspended growth system. The present invention provides an improved fixed-film/suspended, nominally zero-net growth onsite wastewater treatment technology that is incorporated with gravel or graveness SWISs. The coupled contact aeration or controlled biomass system of the present invention is, preferably, preceded by a septic tank and followed by a aggregate or aggregate-free infiltration surface such that a fixed film of biomass can attach and grow on a medium to augment a suspended microbial population thereby providing more biomass to feed on wastewater constituents. Advantages of the well-controlled system of the present invention include increased active microbial mass per unit volume, enhanced potential for nitrification, reduced sludge production, and resilience under variable influent conditions without the need for biomass recycle. Such a controlled biomass system, as the present invention provides, can also be a low-cost means of upgrading existing overloaded OWTSs that do not currently meet BOD or nitrification goals.

BRIEF SUMMARY OF THE INVENTION

Briefly stated, the present invention is directed to a biological treatment system, including a wastewater system drain field and at least one perforated distribution pipe located within the drain field and adapted to receive effluent. At least one perforated outer pipe surrounds the at least one distribution pipe to receive effluent from the at least one distribution pipe and to dispense the effluent to the drain field after it has been biologically treated in the at least one outer pipe.

In another aspect, the present invention is directed to a method of biological treatment comprising the steps of supplying effluent to at least one perforated distribution pipe; discharging the effluent through the at least one perforated distribution pipe; receiving the effluent in at least one perforated outer pipe surrounding the at least one distribution pipe such that the effluent experiences biological treatment; and passing the biologically treated effluent from the at least one perforated outer pipe to a wastewater drain field within which the at least one outer pipe is located.

In another aspect, the present invention is directed to a method of flushing a biological treatment system, comprising the steps of positioning at least one perforated flushing pipe adapted to receive liquid within at least one outer pipe; connecting a vacuum system to an end of the at least one outer pipe; starting the vacuum system; and supplying the liquid to the at least one flushing pipe such that the liquid is distributed within the at least flushing pipe and received by the outer pipe before being removed by the vacuum system.

In yet another aspect, the present invention is directed to a method of biological treatment comprising the steps of supplying effluent to at least one vessel positioned within a wastewater drain field; delivering gas to the at least one vessel to interact with the effluent such that the effluent experiences aerobic biological treatment; and passing biologically treated effluent from the at least one vessel to the wastewater drain field.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
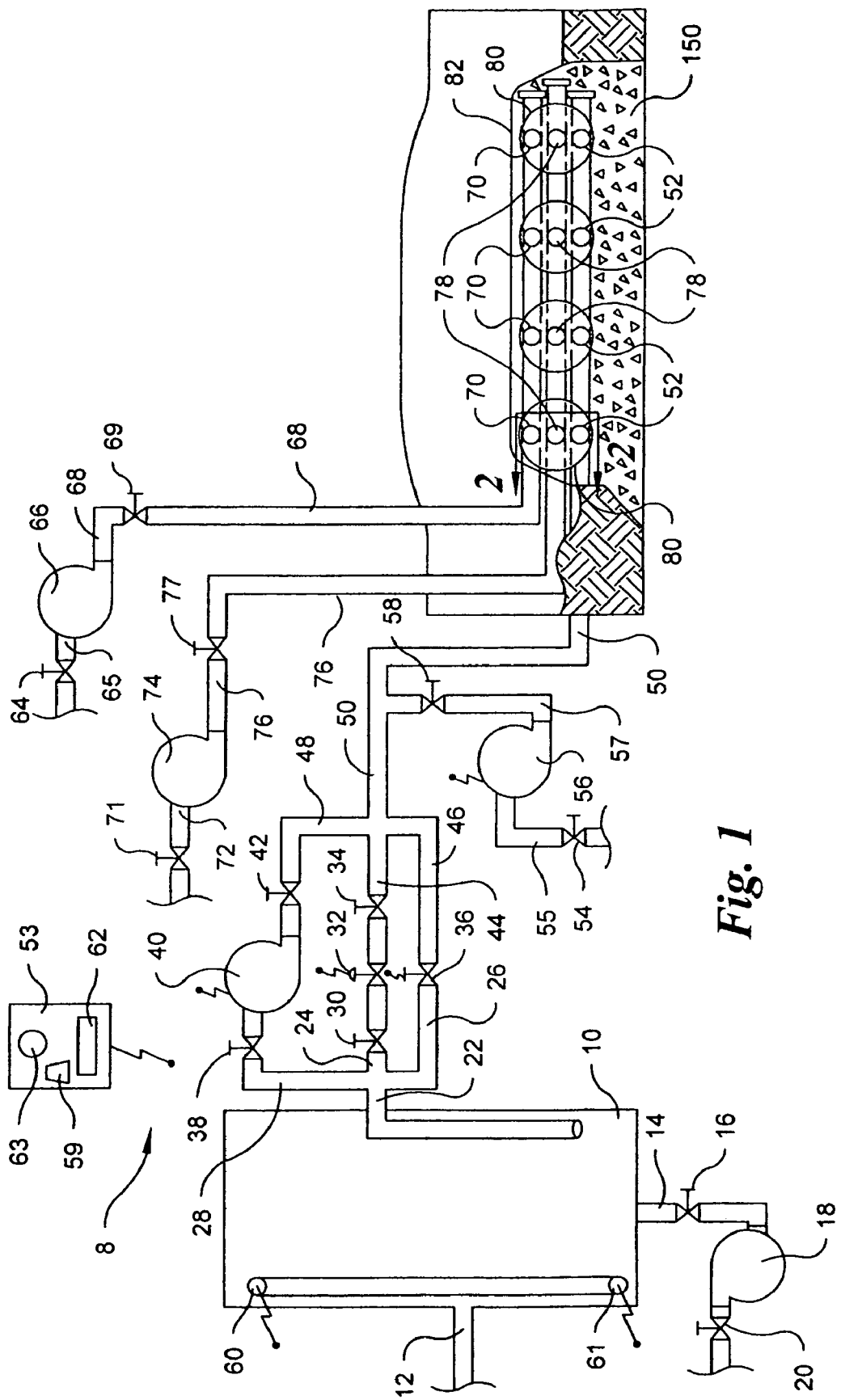
FIG. 1 is a schematic view, partially in cross-section, of an biological treatment system for use with an onsite wastewater system in accordance with a first preferred embodiment of the invention.

Certain terminology is used in the following description for convenience only and is not limiting. The words "right," "left," "lower," and "upper" designate directions in the drawings to which reference is made. The terminology includes the words above specifically mentioned, derivatives thereof and words of similar import.

The biological treatment system, generally designated 8, comprises an OWTS with a conventional gravel or alternative graveness SWIS positioned over a soil infiltration system, as described in more detail below. The biological treatment system 8 is placed on a terrain and/or in a subterranean volume or drain field and is integral to an OWTS such that the system 8 promotes biological treatment to meet high effluent standards. As used herein the term drain field is defined to include at least the SWIS and the soil infiltration system below the SWIS as well as aggregate or aggregate-free components. It will recognized by those skilled in the art from the present disclosure that the present system 8 can also be used to reduce the required size for a drain field. Although not part of the present invention, the biological treatment system 8 preferably includes a septic tank which receives wastewater and sewage from a source such as a house or commercial building and provides for the separation by gravity of gross solids and also the decomposition of bacteria and/or digestion of raw sewage.

Referring to the drawings, wherein like reference numerals are used to indicate like elements throughout, there is shown in FIG. 1 a holding tank 10 in accordance with a first preferred embodiment of the invention. The holding tank 10 is capable of receiving effluent from a septic tank (not shown) by gravity feed or by pumping through a holding tank inlet pipe 12. Preferably, the holding tank 10 is made of a high strength generally rigid material, such as concrete or reinforced plastic, although other similar type materials of construction, including other strong plastic materials, are possible. Also, the holding tank 10 should be designed to have sufficient capacity to hold a maximum daily wastewater volume from, for example, a household or a industrial building.

The holding tank 10, which is considered integral to the biological treatment system 8, includes a recycle pipe 14 which allows settled effluent waste to pass through a return pump inlet valve 16. The return pump inlet valve 16 can be closed thereby isolating the holding tank 10 from a return pump 18. The return pump 18, when operated with the return pump inlet valve 16 open, discharges settled waste through a return pump outlet valve 20 to the septic tank. Preferably, the return pump 18 is a centrifugal-type pump, such as the Model 152 pump available from Zoeller Pump Company, located in Louisville, Ky. However, it will be recognized by those of ordinary skill in the art from this disclosure that other types of return pumps could be used, if desired, without departing from the spirit and scope of the invention.

As shown in FIG. 1, a discharge pipe 22 is connected to the holding tank 10 at a first end and contains a first, second and third discharge pipe branches 24, 26, 28 at a second end. The first discharge pipe branch 24 is connected to a first isolation valve 30 which is connected to a back pressure valve 32 followed by a second isolation valve 34. The second discharge pipe branch 26 is connected to a bypass valve 36. The third discharge pipe branch 28 is connected to a effluent discharge pump inlet valve 38 followed by an effluent discharge pump 40 and a effluent pump discharge outlet valve 42. The second isolation valve 34, the bypass valve 36 and the effluent discharge pump outlet valve 42 are connected to a first header pipe branch 44, a second header pipe branch 46 and a third header pipe branch 48, respectively. The header branches 44, 46, 48 connect to a header pipe 50 which connects to one or more distribution pipes 52. It will be recognized by those skilled in the art from the present disclosure that all the pipes described above are made of a generally rigid material, such as polyvinylchloride (PVC), although other similar materials of construction are possible.

The holding tank 10 is intended to be designed to operate by gravity flow or, preferably, by dosing utilizing control equipment 53 such that a controlled retention time is provided in the biological treatment system 8 at a design temperature. The design temperature of the system 8 can be estimated based on engineering calculations and/or controlled by a heating means. Preferably, the heating means is hot water supplied, as and if necessary, through a hot water inlet valve 54 to a hot water supply pipe 55 and then to a hot water pump 56. A hot water discharge pipe 57 is connected to the hot water pump 56 on one end and a hot water outlet valve 58 on the other end such that hot water is supplied, as and if necessary, to the header pipe 50. The hot water pump 56 is controlled by a temperature sensor 59 in the control equipment 53 such that the temperature of the effluent is determined by placing a thermocouple (not shown) in the header pipe 50 about at the location of the distribution pipes 52. Preferably, the hot water pump 56 is a centrifugal-type pump, such as a Model 310 pump available from Zoeller Pump Company, located in Louisville, Ky. However, it will be recognized by those of ordinary skill in the art from this disclosure that other types of water pumps could be used, if desired, without departing from the spirit and scope of the invention.

In an embodiment of the invention, the holding tank 10 discharges effluent by gravity flow by closing the first isolation valve 30, closing the effluent discharge pump inlet valve 38 and opening the bypass valve 36; otherwise, the bypass valve 36 is intended to remain closed. This gravity flow method discharges effluent from the holding tank 10 to the discharge pipe 22, then the second discharge pipe branch 26, through the bypass valve 36 to the second header pipe branch 46 to the header pipe 50 to the distribution pipes 52. However, typically, gravity flow will not distribute the effluent evenly throughout all of the distribution pipes 52 which is one reason gravity flow is not the only method of the present invention.

Alternatively, the bypass valve 36 is closed, the effluent discharge pump inlet valve 38 is closed and the first isolation valve 30 is open. The back pressure valve 32 and the second isolation valve 34 are open to allow the effluent to siphon from the holding tank 10 to the distribution pipes 52.

Dosing is also an aspect of the present invention and timed dosing, as opposed to volume dosing, is preferred. Dosing allows the accumulation of wastewater effluent in the holding tank 10 from which the effluent is periodically discharged in "doses" to the distribution pipes 52 by the effluent discharge pump 40 or by siphoning through the back pressure valve 32. Both the effluent discharge pump 40 and the back pressure valve 32 can be controlled remotely by the control equipment 54 in a manner well understood by those of ordinary skill in the art. Preferably, the effluent discharge pump 40 is a centrifugal-type pump, such as the Model 152 pump available from Zoeller Pump Company, located in Louisville, Ky. However, it will be recognized by those of ordinary skill in the art from this disclosure that other types of effluent discharge pumps could be used, if desired, without departing from the spirit and scope of the invention.

The effluent, which can be considered pretreated since it would have already passed through the septic tank, is allowed to accumulate in the holding tank 10 and is discharged when a predetermined effluent level, effluent volume, or elapsed time is reached. The dose volumes and discharge rates are by design such that the distribution pipes 52 are filled or nearly filled, as disclosed in more detail below, resulting in more uniform distribution over the infiltration surface as compared to gravity flow designed systems. Dosing will typically outperform the gravity-flow method of the present invention since dosing provides better distribution of effluent in a more uniform and better controlled manner.

Two methods of dosing are included as part of this invention—volume or demand dosing and, preferably, time dosing. With demand dosing there are one or more sensors positioned in the holding tank 10 for controlling periodic delivery of dosing of the effluent from the tank 10 to the drain field, as described in more detail hereinafter. When demand dosing is utilized the wastewater effluent rises to a preset level in the holding tank 10, as determined by a sensor or high level indicator 60 and is lowered to a preset level in the holding tank 10 as determined by a low level indicator 61. Both the high level indicator 60 and the low level indicator 61 provide an input to a float switch 62 or other mechanism located in the control equipment 53 such that the control equipment 53 activates the effluent discharge pump 40 or the back pressure valve 32 initiating effluent discharge from the holding tank 10. During peak-flow periods, dosing is frequent with little time between doses for the infiltration system to drain and for the subsoil to reaerate. During low-flow periods, dosing intervals are long which can be an inefficient use of the hydraulic capacity of the system and can reduce treatment system control since desired effluent retention times cannot be maintained.

The use of time dosing in the present invention overcomes some of the shortcomings of demand dosing. A timer 63 is used to turn the effluent discharge pump 40 on and off at specified time intervals so that only a predetermined volume of wastewater is discharged with each dose. Timed dosing has two distinct advantages over demand dosing. First, the doses can be predetermined at specified times during each day to optimize the use of the soil's treatment capacity and, second, the distribution pipes 52 receive their designed volume each dose such that desired effluent retention times are achieved.

Referring again to FIG. 1, a gas delivery inlet valve 64 is connected to a gas delivery pipe 65 which is connected to a gas delivery pump 66. The gas delivery pump 66 discharges gas, including oxygen, at a pressure greater than atmospheric pressure to a gas delivery header pipe 68, through a gas delivery outlet valve 69, and then one or more gas delivery pipes 70. Alternatively, hot gas, e.g., air from a residential home, can be the heating means previously described and can be supplied to the gas delivery inlet valve 64 and ultimately to the gas delivery pipes 70, as and if necessary, to control the temperature in the system 8. An inlet flushing valve 71 provides fluid, which is preferably water, via a flushing inlet pipe 72 to a flushing pump 74 that discharges the fluid to a flushing header pipe 76 then through an outlet flushing valve 77 to one or more flushing pipes 78. As described below, one or more outer pipes 80, which are, preferably, covered or blanketed by a barrier 82, surround and enclose the distribution pipes 52, the gas delivery pipes 70 and the flushing pipes 78.

Preferably, the gas delivery pump 66 and the flushing pump 74 are integral to the biological treatment system 8 but are located remotely from the biological treatment system 8. However, these pumps can be located in an above-grade or underground housing located in proximity to the biological treatment system 8. The flushing pump 74 is intended to be used periodically as and if required and, therefore, may be portable.

The gas supplied by the gas delivery pump is, preferably, air which provides adequate oxygen to the system 8 in order to maintain the system 8 aerobically. In a preferred embodiment, the gas delivery pump 66 operates constantly during the operation of the system 8 and is a 17 Watt oilless linear pump, such as a Model SPP-15GA-101 available from Gast Manufacturing, Inc., located in Benton Harbor, Mich. Also in a preferred embodiment, the flushing pump 74 is not operating and fluid is not provided to the flushing pipes. However, preferably, the flushing pump 74 is a centrifugal-type pump, such as a Model 310 pump available from Zoeller Pump Company, located in Louisville, Ky. However, it will be recognized by those of ordinary skill in the art from this disclosure that other types of gas delivery pumps and flushing pumps or compressors could be used, if desired, without departing from the spirit and scope of the invention.

The barrier 82 comprises a geofabric or fluid and gas impermeable barrier that is installed over the top and along the sides of the outer pipes 80. The barrier 82 prevents fill soil, which is preferably located over the barrier 82 from contacting the outer pipes 80 and, preferably, also prevents fluid and gas, which is preferably air, from escaping the biological treatment system 8. The barrier 82 is, preferably, made of a generally pliable material, such as 30 mil PVC geomembrane sheeting material, although other similar type materials of construction are possible so long as the material is fluid and gas impermeable. For instance, the barrier 82 could be a geofabric, geomembrane and/or a combination of geofabric and geomembrane. Also, it is a preferred design feature of the invention to use a barrier 82 that provides heat transfer and insulating properties to the biological treatment system such that the temperature of the biological treatment system can be determined and/or maintained.

Figure 2:
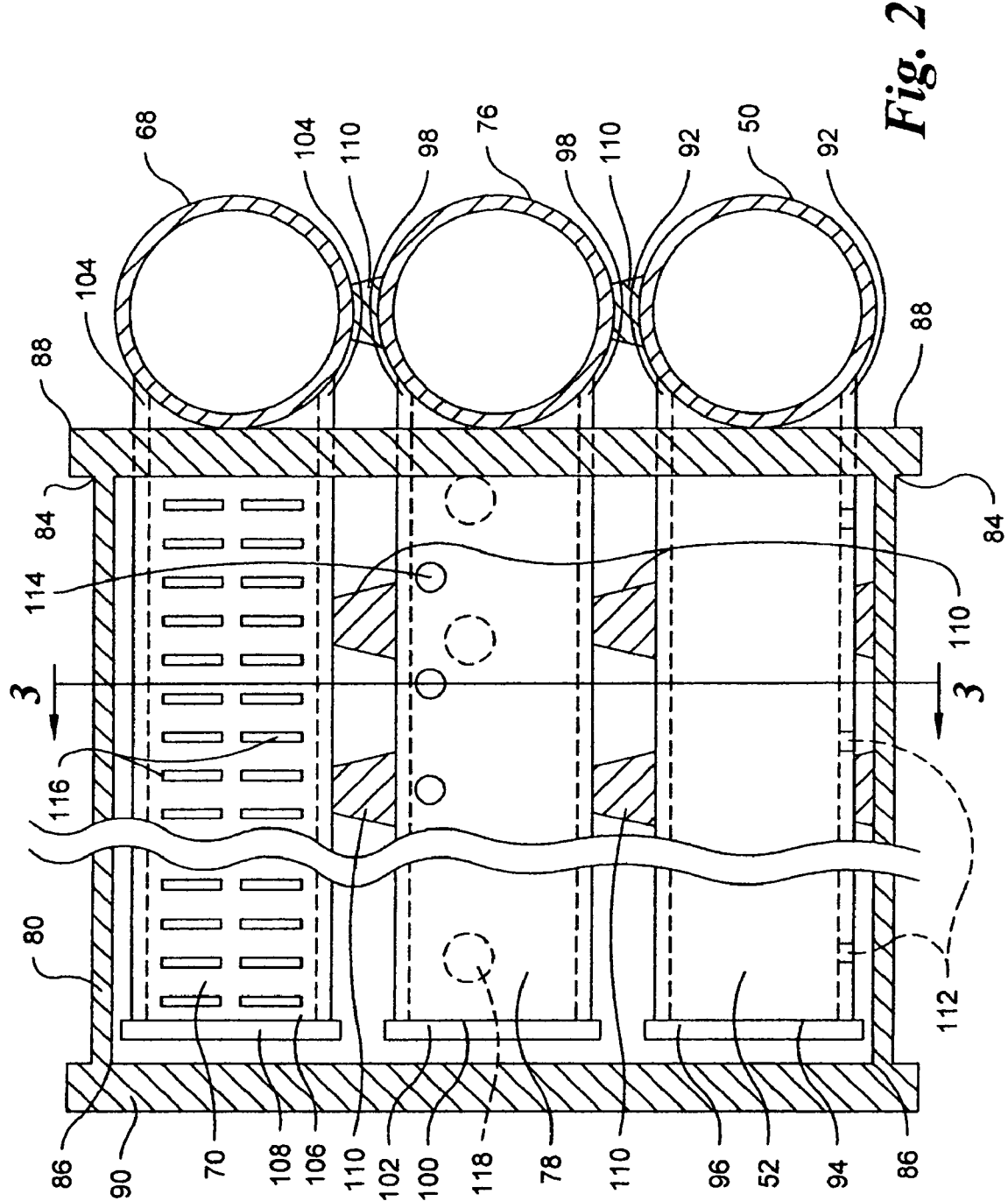
FIG. 2 is an enlarged cross-sectional view of a section of the biological treatment system of FIG. 1 taken along line 2—2 of FIG. 1.

Referring now to FIG. 2, the outer pipe 80 has a first end 84 and a second end 86. The first end 84 of each outer pipe 80 is connected to a first end cylindrical cap 88 such that the distribution pipe 52, the gas delivery pipe 70 and the flushing pipe 78 pass through the cap 88. It will be recognized by those skilled in the art from the present disclosure that gasket material (not shown) or other sealing means, such as glue or solvent cement, may be necessary, for example, at the locations where the distribution pipe 52, gas delivery pipe 70, and the flushing pipe 78 pass through the cap 88 in order to join the pipes in a liquid tight manner. The second end 86 of each outer pipe 80 is connected to a second end cylindrical cap 90 such that no fluid and/or gas can escape from the first end 84 and the second end 86 when the second end cylindrical cap 90 is connected. The second end cylindrical cap 90 is intended to be periodically removed allowing access to each outer pipe 80 as necessary. Preferably, the outer pipes 80 and the cylindrical caps 88, 90 are made of a generally rigid material, such as PVC, although other similar materials of construction are possible. The first end 84 and the second end 86 are connected to the first end cylindrical cap 88 and the second end cylindrical cap 90, respectively, preferably by normal PVC connection techniques or, alternatively, by other techniques well understood by those of ordinary skill in the art.

As shown in FIG. 2, the distribution pipe 52 is connected to the header pipe 50 at a first end 92 of the distribution pipe 52 such that effluent can flow from the header pipe 50 to the first end 92 and ultimately along a length of the distribution pipe 52. A second end 94 of the distribution pipe is normally attached to a cylindrical cap 96 which can be periodically removed, as necessary, to gain access inside the distribution pipe 52. Similarly, the flushing pipe 78, which is, preferably, located above the distribution pipe 52, is connected to the flushing header pipe 76 at a first end 98 of the flushing pipe 78 such that fluid can flow from the flushing header pipe 76 to the first end 98 and along a length of the flushing pipe 78. A second end 100 of the flushing pipe 78 is normally attached to a cylindrical cap 102 which can be periodically removed, as necessary, to gain access inside the flushing pipe 78. Similarly again, the gas delivery pipe 70, which is, preferably, located above the flushing pipe 78, is connected to the gas delivery header pipe 68 at a first end 104 of the gas delivery pipe 70 such that fluid, including gas containing oxygen, can flow from the gas delivery header pipe 68 to the first end 104 and ultimately along the length of the gas delivery pipe 70. A second end 106 of the gas delivery pipe 70 is normally attached to a cylindrical cap 108 which can be periodically removed, as necessary, to gain access inside the gas delivery pipe 70. Preferably, the gas delivery header pipe 68, the gas delivery pipes 70, the flushing header pipe 76 and the flushing pipes 78, like the header pipe 50 and distribution pipes 52 described above, are made of a generally rigid material, such as PVC, although other similar materials of construction are possible. The first ends 92, 98, 104 and the second ends 94, 100, 106 are connected to the header pipes 50, 68, 76 and the cylindrical caps 96, 102, 108 preferably by normal PVC connection techniques or, alternatively, by other techniques well understood by those of ordinary skill in the art.

Figure 3:
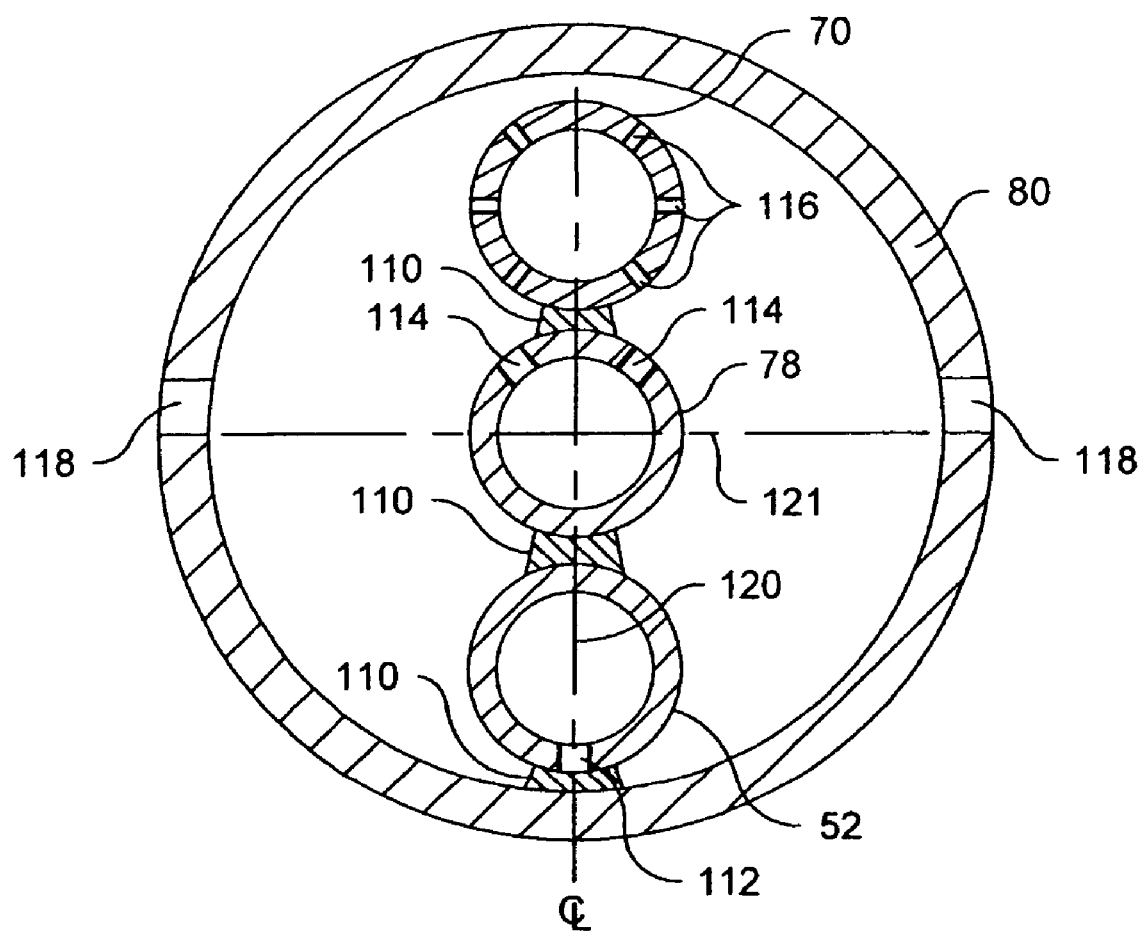
FIG. 3 is an enlarged cross-sectional view of the distribution pipe, the flushing pipe, the gas delivery pipe, and the outer pipe shown in FIG. 2, taken along line 3—3 of FIG. 2.

Referring to FIGS. 2 and 3, spacers 110 are connected permanently to a bottom outside portion of the distribution pipes 52, the gas delivery header pipes 68, the gas delivery pipes 70, the flushing header pipes 76, and the flushing pipes 78 such that the spacers 110 are in contact with, but not permanently attached to, a top outside portion of the header pipe 50, distribution pipes 52, the flushing header pipes 76, the flushing pipes 78 as well as a bottom inside portion of the outer pipes 80 to provide support for the pipes 52, 68, 70, 76, 78. Also, the spacers 110 located between the distribution pipes 52 and both the flushing pipes 78 and the outer pipes 80 allow biomass to attach to them. The spacers 110 are, preferably, constructed of the same type of material as the distribution pipes 52, the gas delivery pipes 70, the flushing pipes 78 and the outer pipes 80. It will be recognized by those of ordinary skill in the art from this disclosure that the location and connection of the spacers 110 will depend on the arrangement of the distribution pipes 52, the gas delivery pipes 70 and the flushing header pipes 76 inside the outer pipes 80.

Referring again to FIGS. 2 and 3, the distribution pipes 52 are perforated providing circular distribution pipe holes 112 located, preferably, about every 5–10 feet along a bottom length of the distribution pipe 52. Similarly, the flushing pipes 78 have circular flushing pipe holes 114 located, preferably, about along a first 5 feet of length from the first end 98 of the flushing pipes 78. Also, the gas delivery pipes 70 are slotted providing grooves 116 which are located along a portion or the entire length of the gas delivery pipes 70. It will be recognized by those skilled in the art from the present disclosure that grooves 116 can be placed around only a portion or the entire circumference of the gas delivery pipes 70 in different patterns and designs without departing from the spirit and scope of the invention. Preferably, the gas delivery pipes 70 are slotted PVC Well Screen material available from the Monoflex Division of Campbell Manufacturing, Inc., located in Bechtelsville, Pa. The outer pipes 80 also have circular outer pipe holes 118 located, preferably, about every 5–10 feet along the length of the outer pipes 80 such that the distribution pipe holes 112 are about evenly spaced between the outer pipe holes 118.

During maintenance and/or cleaning the system 8 is not operating with the exception of the flushing pump 74 in conjunction with the flushing piping 72, 76, 78. During cleaning of the system 8, for example, fluid, preferably water, is provided from a source (not shown) to the flushing inlet pipe 72 and then to the flushing pump 74 where it is discharged to the flushing header pipe 76. The fluid then enters the flushing pipes 78 and is discharged through the flushing pipe holes 114, which are, preferably, located toward the first end 98 of the flushing pipes 78, to the inside circumference of the outer pipes 80. Simultaneously, a vacuum system (not shown) is attached to the second end 86 of the outer pipes 80 such that settled effluent, e.g., sludge, and the fluid from the flushing pipes 78 is collected by the vacuum system, removed from the system 8 and placed in a vacuum truck for disposal.

Referring now to FIG. 3, preferably, the distribution pipes 52, the gas delivery pipes 70 and the flushing pipes 78 are located inside and completely surrounded by the larger outer pipes 80. In the first preferred embodiment, the distribution pipe 52 is located below the flushing pipe 78 which is located below the gas delivery pipe 70. However, it will be recognized by those skilled in the art from the present disclosure that the gas delivery pipes 70 can be located outside and above the outer pipes 80 if gas receiving holes (not shown) are provided on a top portion of the outer pipes 80 and above the outer pipe holes 118. It will also be recognized by those skilled in the art from the present disclosure that, since the system 8 of the present invention is intended to be a nominally zero-net growth system, it may not be necessary to use the flushing pipes 78 and it may be possible to remove the flushing pipes 78 from inside the outer pipes 80 and still have the system 80 function effectively.

Preferably, the distribution pipes 52, the gas delivery pipes 70 and the flushing pipes 78 are ¾-inch inside diameter and the outer pipes 80 are 4-inch or 6-inch inside diameter although other diameters are possible for the distribution pipes 52, the gas delivery pipes 70, the flushing pipes 78, and the outer pipes 80. For example, if the gas delivery pipes 70 are located outside and above the outer pipes 80 then it is possible to have distribution pipes 52 and flushing pipes 78 that are about 1½-inch in diameter. However, the outer pipes 80 must be larger in diameter than the combined size of the distribution pipes 52 and the flushing pipes 78. The distribution pipe holes 112 and the flushing pipe holes 114 are intended to be about the same size although this is not critical to the effective operation of the system 8, and, preferably, are about ¼-inch–½-inch in diameter.

Referring again to FIG. 3, preferably, the distribution pipe holes 112 are arranged such that they are at the bottom of distribution pipe 52 in relation to a centerline ($C_L$) 120. Preferably, the flushing holes 114 are about 25 degrees from the left and from the right of the centerline top of the outer pipe 80 or about 40 degrees from each other flushing pipe hole 114 around the circumference of the flushing pipe 78, although a larger degree or a lesser degree of spacing is possible as long as the flushing pipe holes 114 do not interfere with the operation of the outer pipe or the aerobic treatment system 8. The slotted grooves 116 are about ¹⁄₁₀₀-inch wide and are located around a majority of a circumference of a the gas delivery pipe 70 such that the grooves are uniformly located along the length of the gas delivery pipe 70. Also, preferably, the circular outer pipe holes 118 are about ½-inch–¾-inch in diameter although it will be understood that other diameters can be used effectively. The outer pipe holes 118 are located on either side of the outer pipe 80 at, preferably, about 90-degrees in both directions from the top of the outer pipe 80. The outer pipe holes 118 are at a height above the bottom of the outer pipe 80 such that a fixed-film of biomass can attach, not only completely around the outside circumference of the distribution pipe 52 and on the inside circumference of the outer pipe 80 to a height of the outer pipe holes 118, but also on a majority of the outside circumference of the flushing pipe 78. It will be understood by those skilled in the art that the outer pipe holes 118 can be located at any height above the bottom of the outer pipe 80 as long as the outer pipe holes 118 are below the height of the flushing pipe holes 114.

The distribution pipe 52 is, preferably, arranged such that it is not centered inside the outer pipe 80 but is, preferably, below the center of the outer pipe 80 such that the top of the distribution pipe 52 is below the center of the outer pipe 80 and the bottom of the distribution pipe 52 is about ½-inch above the inside bottom section of the outer pipe 80. Such an arrangement allows a fixed film of biomass, once received from the header pipe 50, to attach not only on the inside circumference of the outer pipe 80 to a height of the outer pipe holes 118 but also allows a fixed film of biomass to attach completely around the outside circumference of the distribution pipe 52 thereby augmenting the suspended microbial population providing more biomass to feed on wastewater constituents.

Similarly, the flushing pipe 78 is, preferably, arranged such that it is located above the distribution pipe 52 and about centered inside the outer pipe 80. However, the flushing pipe 78 must be located high enough inside the outer pipe 80 such that the flushing pipe holes 114 are above the outer pipe holes 118. Such an arrangement allows a fixed film of biomass to attach around a bottom portion of the circumference of the flushing pipe 78 thereby augmenting the suspended microbial population providing more biomass to feed on wastewater constituents.

It can be seen in FIG. 3 that a flow line 121, which runs beneath the outer pipe holes 118, defines the volume of liquid effluent that can be retained in the outer pipe 80. This is also the volume available for biological pretreatment in the present invention. This volume can be calculated from the known volume of the outer pipe 80 below the flow line 121 minus the known volume of the distribution pipe 52 and the flushing pipe 78 located below the flow line 121. Similarly, the wetted surface area available for fixed film biological pretreatment can also be determined. By determining these system parameters the biological treatment system 8 can be controlled in terms of the volume and surface area available for suspended and fixed-film operation. Further, by understanding the volume and surface area available for suspended and fixed-film operation, the effluent retention time in the biological treatment system 8 can be optimized. Also, it can be seen that the flow, distribution, and retention properties of the biological treatment system can be altered in several ways and thus can be tailored to specific sites, applications and volume demands. For example, effluent retention time is a function of the size, number and placement of the distribution pipe holes 112 and the outer pipe holes 118 as well as the lengths and diameters of the distribution pipes 52 and the outer pipes 80. In addition, the number of distribution pipes 52 and outer pipes 80 can be increased or decreased which also affects retention time of a similar daily flow of wastewater.

Another aspect of the present invention is to provide a method of treating or pretreating wastewater effluent using the fixed-film/suspended growth biological treatment system already described such that when the system 8 is properly operated effluent is transferred from a septic tank to the holding tank 10 through the distribution pipe(s) 52 to the outer pipe(s) 80 where nominally zero-net growth aerobic activity is maintained by oxygen in the gas provided through the gas delivery pipe(s) 70 before being discharged to the drain field below. The method of this invention, like the system 8 itself, is capable of having and intended to have the following features:

(a) known and controlled volume and surface area for suspended and fixed film biological treatment processes;

(b) known and controlled retention times in the biological treatment system;

(c) known and controlled oxygen supply and oxygen transfer to the biological treatment system; and, (d) known and controlled temperature throughout the biological treatment system and process.

Referring again to FIG. 1, in a first preferred embodiment of the invention effluent is transferred from a septic tank to the holding tank 10 where it is discharged about every 4 hours. Such timed dosing is accomplished by setting the timer 63 such that it turns on the effluent discharge pump 40 every 4 hours for about 2–3 minutes or until the holding tank 10 level reaches a minimum set level as determined by the low level indicator 58. When the effluent discharge pump 40 turns on, effluent discharges from the holding tank 10, passes through the effluent discharge pump inlet valve 38 to the effluent discharge pump 40, past the through the effluent discharge pump outlet valve 42 to the header pipe 50. The effluent is then delivered to the distribution pipes 52 where it is discharged through the distribution pipe holes 112 to the outer pipes 80 where the effluent experiences biological activity. Aerobic activity can be maintained by oxygen in the gas provided to the gas delivery pipes 70, via the gas delivery pump 66, through the grooves 116 in the gas delivery pipes 70. The treated effluent and the gas is discharged through the outer pipe holes 118 to a conventional leach field 150 which comprises, for example, gravel or crushed stone.

Figure 4:
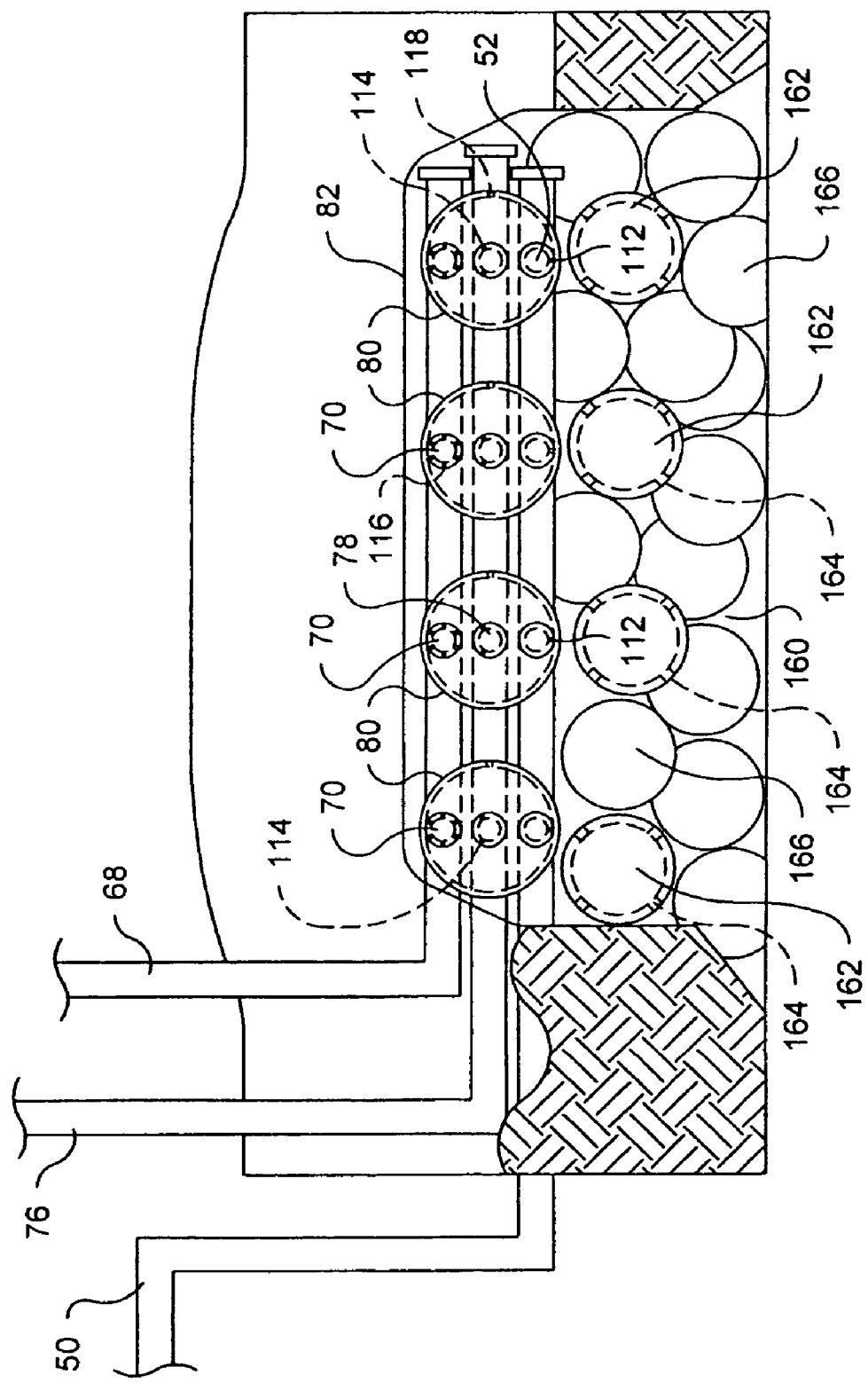
FIG. 4 is an enlarged cross-sectional view of a portion of an biological treatment system in accordance with a second preferred embodiment of the invention.

Referring now to FIG. 4, in a second preferred embodiment, the biological treatment system 8 of the present invention provides effluent to the distribution pipes 52 and the outer pipes 80 in the same manner as described in the first preferred embodiment of the present invention. However, in the second preferred embodiment the effluent discharges from the outer pipes 80, via the outer pipe holes 118, to an graveness drain field assembly 160. Such an alternative graveness drain field assembly 160 can include, for example, distribution pipes 162 having a plurality of holes 164 and void pipes 166 that retain and distribute the treated effluent received from the outer pipes 80 via the distribution pipes 52 of the system 8 of the present invention. The graveness drain field assembly 160 described as part of this embodiment can have various designs and arrangements of pipes such as, for example, that described by Atchley, et al. in U.S. Pat. Nos. 5,516,229 and 5,520,481, which are hereby incorporated by reference in their entirety.

Referring again to FIG. 4, in an alternative configuration of the second preferred embodiment, the biological treatment system 8 of the present invention provides effluent to the distribution pipes 52 and the outer pipes 80 in the same manner as described in the second preferred embodiment of the present invention. However, in the alternative configuration the outer pipes 80, with enclosed distribution pipes 52, gas delivery pipes 70 and flushing pipes 78, of the biological treatment system 8 are used in lieu of the distribution pipes 162. As a result, effluent passes from the distribution pipe 52 to the outer pipe 80 where it passes through the outer pipe holes 118 to the void pipes 166 where the effluent is retained and distributed.

Figure 5:
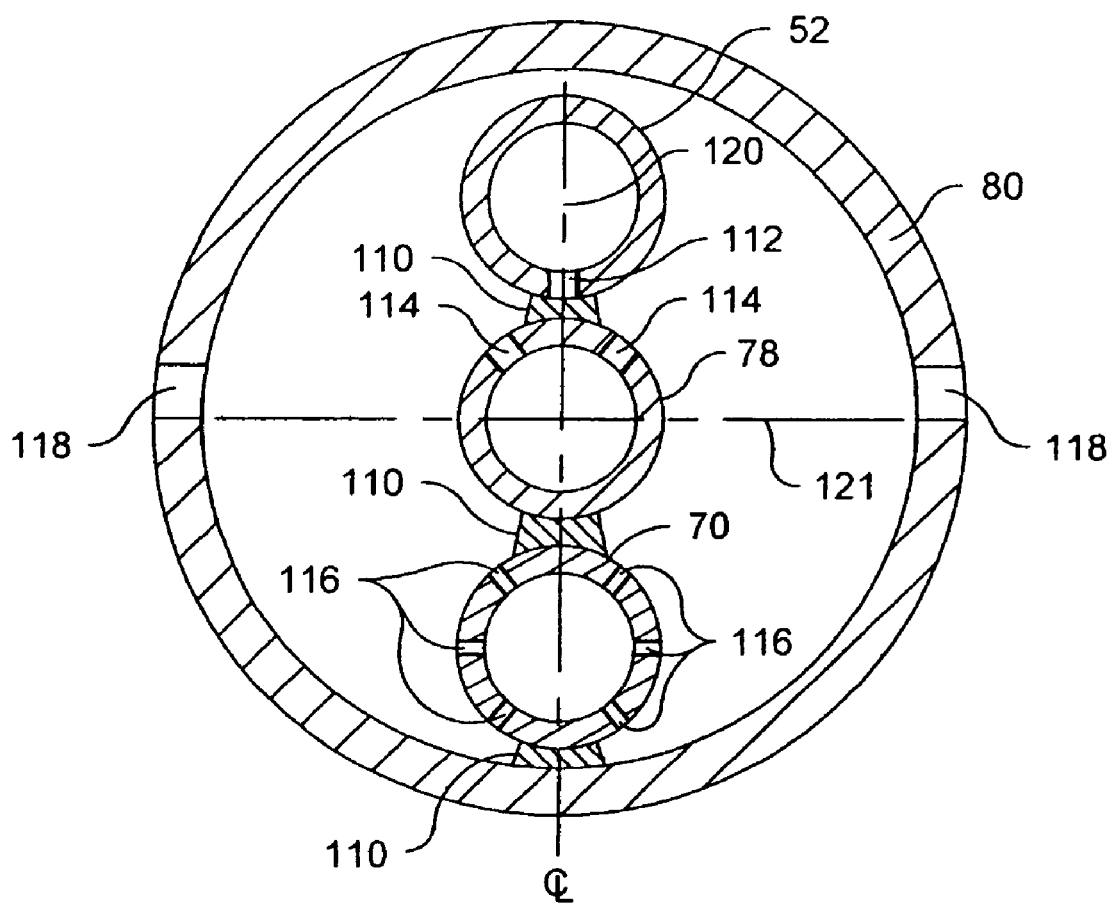
FIG. 5 is an enlarged cross-sectional view of the distribution pipe, the flushing pipe, the gas delivery pipe, and the outer pipe in accordance with a third preferred embodiment of the invention; and, FIG. 6 is an enlarged cross-sectional view of the distribution pipe, the flushing pipe, the gas delivery pipe and the outer pipe in accordance with a fourth preferred embodiment of the invention.

Referring to FIG. 5, in a third preferred embodiment, the aerobic treatment system 8 of the present invention provides effluent to the distribution pipes 52 and the outer pipes 80 in the same manner described in the previous preferred embodiments of the present invention. However, in the third preferred embodiment, the distribution pipe 52 is located inside the outer pipe 80 and above the flushing pipe 78. Also, the gas delivery pipe 70 is located below the flushing pipe 78. As such, gas containing oxygen flows from the grooves 116 in the gas delivery pipe 70 directly into the effluent contained in the outer pipe 80 before excess oxygen not absorbed by the effluent surfaces to the flow line 121. Thus, in addition to supplying oxygen to the space above the flow line 121, the gas delivery pipe 70 in the third preferred embodiment promotes increased oxygen transfer by supplying gas directly to the effluent where a portion of the oxygen in the gas is absorbed by the effluent and the remainder of the gas disturbs the surface of the flow line 121 thereby ensuring aerobic activity. The third preferred embodiment also allows biomass to attach completely around the outside circumference of the gas delivery pipe 70 and, as previously disclosed, around a majority of the outside circumference of the flushing pipe 78 since a majority of the flushing pipe 78 is located below the flow line 121 and therefore in contact with the effluent. Also, in the third preferred embodiment, the gas delivery pipes 70, in addition to or in lieu of the slotted PVC Well Screen previously described, can comprise a diffuser-type design such as the Tubeflex® Fine Bubble Air Diffuser Model TFX-26 Type II available from the Red Valve Company, Inc., located in Pittsburgh, Pa. It will be recognized by those skilled in the art that the introduction of gas, e.g., air, by a diffuser submerged in the effluent produces a large quantity of small bubbles as compared to the larger bubbles produced by a slotted Well Screen pipe. As such, it will also be recognized by those skilled in the art that the use of a diffuser provides more bubble surface area for oxygen transfer in the effluent thereby improving oxygen transfer in the effluent in comparison to a similarly submerged slotted pipe.

Figure 6:
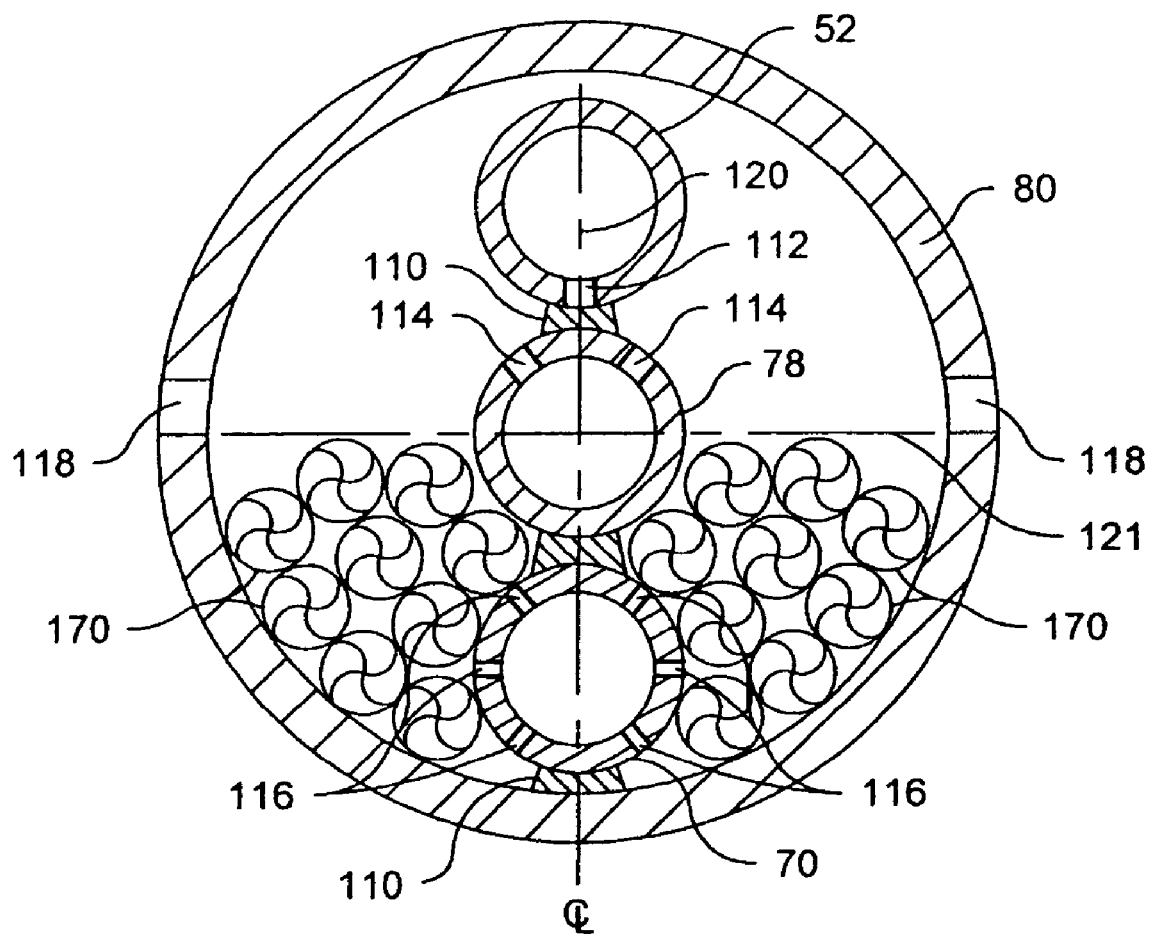

Referring now to FIG. 6, in a fourth preferred embodiment, the aerobic treatment system 8 of the present invention provides effluent to the distribution pipes 52 and the outer pipes 80 in the same manner described in the third preferred embodiment of the present invention. However, in the fourth preferred embodiment packing material 170 is placed inside at least a portion of the outer pipe 80 below the flow line 121 in all or a portion of the length of the outer pipe 80 and in available space not otherwise occupied by the gas delivery pipe 70 and the flushing pipe 78. It will be recognized by those of ordinary skill in the art from the disclosure of this embodiment that sections of the outer pipe 80 can repeatedly be filled with the packing material 170 followed by sections that do not contain the packing material along the length of the outer pipe 80 without departing from the spirit and scope of the invention.

It will also be recognized by those of ordinary skill in the art from the disclosure of this embodiment that, if desired, the packing material 170 can be placed inside at least a portion of the outer pipe 80 below the flow line 121 in available space not otherwise occupied by the distribution pipe 52 and the flushing pipe 78 as these pipes 52, 78 are described in the first and second preferred embodiments and shown, for example, in FIG. 3, without departing from the spirit and scope of the invention. The packing material 170 is inserted to provide additional surface area for fixed-film growth of biomass resulting in increased aerobic activity. Preferably, the packing material only occupies a portion of the available space below the flow line 121 which can be ensured, if necessary by using a screen (not shown) that can be attached by conventional means to the inside circumference of the outer pipe 80. The use of the screen is not considered critical to the invention, however, if a screen is not used the size of the packing material should be larger than the outer pipe holes 118 so that the packing material is not capable of escaping from inside in the outer pipe 80.

The packing material 170 is a generally rigid open-spherical material such as 1-inch polypropylene Jaeger Tri-Packs® available from Jaeger Products®, Inc., located in Houston, Tex. Various types of media, such as a media comparable to the AccuWeb® active fabric media available from Brentwood Industries, Inc., located in Reading, Pa., could be used with or in lieu of packing material in order to provide additional surface area for fixed-film growth of biomass. It will be recognized by those skilled in the art from this disclosure that other types and sizes of packing material and/or media could be used, if desired, without departing from the spirit and scope of the invention. It will also be recognized by those skilled in the art from this disclosure that the size (diameter) of the outer pipe 80, the distribution pipe 52, the gas delivery pipe 70 and the flushing pipe 78 can be changed to accommodate a desired amount, type or size of packing material 170 without departing from the spirit and scope of the invention.

It will be recognized by those skilled in the art from the present disclosure that in order for the system 8 to operate effectively only one or more outer pipe(s) 80 and one or more distribution pipe(s) 52 are necessary such that oxygen is provided to the inside diameter of the outer pipe(s) 80 to allow aerobic activity to take place on a fixed-film/suspended growth of biomass inside the outer pipe(s) 80. Therefore, it will be recognized by those skilled in the art from the present disclosure that the system 8 can effectively aerobically treat effluent without, for example, the use of the flushing pipes 78 which are intended to be used only periodically as and if necessary to remove waste, e.g., sludge, from inside the outer pipes 80.

It will also be recognized by those skilled in the art from the present disclosure that the gas exchange portion of the system 8 need not be provided if treatment of effluent by anoxic or anaerobic organisms is desired. Without fresh air exchange, organisms which require oxygen will die off and anoxic and/or anaerobic organisms will multiply in numbers. Such systems can be used to treat, for example, nitrates in order to prevent them from being discharged into the ground water.

Further, it will be recognized by those skilled in the art from the present disclosure that the distribution pipes 52, the gas delivery pipes 70, the flushing pipes 78 and the outer pipes 80 can be configured such that these pipes contain branches that are arranged in series or parallel to distribute the effluent to the gravel or graveness onsite treatment systems described in the present invention and specifically described in the first and second preferred embodiments of the present invention. Similarly, the particular distribution pipes 52, the gas delivery pipes 70, the flushing pipes 78 and the outer pipes 80 are generally in the form of a vessel which provides for enhanced aerobic activity in the drain field. As such it is apparent to one of ordinary skill in the art that the present invention is not limited to the particular distribution pipes 52, the gas delivery pipes 70, the flushing pipes 78 and the outer pipes 80 and that other vessels could be used to enhance the aerobic activity within the drain field.

Finally, it will be appreciated by those skilled in the art that changes could be made to the embodiments described above without departing from the broad invention concept thereof. It is understood, therefore, that this invention is not limited to the particular embodiments disclosed, but is intended to cover modifications within the spirit and scope of the present invention.

I claim:

1. A biological treatment system comprising:
  a wastewater system drain field;
  at least one perforated distribution pipe located within the drain field and adapted to receive effluent; and
  at least one perforated outer pipe surrounding the at least one distribution pipe to receive and retain effluent from the at least one distribution pipe for a period of time and to dispense the effluent to the drain field after it has been biologically treated in the at least one outer pipe.

2. The biological treatment system of claim 1, wherein the at least one distribution pipe is located adjacent an inside bottom surface of the at least one outer pipe.

3. The biological treatment system of claim 1, wherein the perforations of the at least one distribution pipe are spaced along a bottom portion of a length of the at least one distribution pipe.

4. The biological treatment system of claim 1, wherein the perforations of the at least one outer pipe are spaced along opposite sides of the outer pipe.

5. The biological treatment system of claim 1 further comprising at least one perforated gas delivery pipe positioned within the at least one outer pipe and being adapted to receive gas containing oxygen such that the gas is distributed within the at least one outer pipe to interact with the effluent.

6. The biological treatment system of claim 5, wherein the at least one gas delivery pipe is located above the at least one distribution pipe.

7. The biological treatment system of claim 5, wherein the at least one perforated gas delivery pipe is in fluid communication with a gas delivery header pipe.

8. The biological treatment system of claim 5, wherein the at least one gas delivery pipe is located below the at least one distribution pipe.

9. The biological treatment system of claim 5, wherein the at least one gas delivery pipe is at least one diffuser.

10. The biological treatment system of claim 5, further comprising at least one perforated flushing pipe which is located between the at least one distribution pipe and the at least one gas delivery pipe.

11. The biological treatment system of claim 1, further comprising a barrier located above the at least one outer pipe which isolates and insulates the at least one outer pipe from a surrounding environment.

12. The biological treatment system of claim 11, wherein the barrier is at least one of a geofabric, a geomembrane and includes both a geofabric and geomembrane.

13. The biological treatment system of claim 1, further comprising at least one perforated flushing pipe positioned within the at least one outer pipe and adapted to receive liquid and discharge the liquid to the at least one outer pipe.

14. The biological treatment system of claim 13, wherein the perforations of the at least one flushing pipe are spaced along one end of the at least one flushing pipe.

15. The biological treatment system of claim 14, wherein the at least one flushing pipe is in fluid communication with a flushing header pipe.

16. The biological treatment system of claim 1, further comprising a tank in fluid communication with the at least one distribution pipe for allowing effluent to pass from the tank to the at least one distribution pipe.

17. The biological treatment system of claim 16, further comprising a return pump in fluid communication with the tank to pump effluent from the tank.

18. The biological treatment system of claim 17, further comprising a sensor positioned within the tank for controlling a periodic delivery or dosing of the effluent from the tank to the at least one distribution pipe.

19. The biological treatment system of claim 18 further comprising a discharge pump in fluid communication with the tank to deliver the effluent from the tank to the at least one distribution pipe.

20. The biological treatment system of claim 1, further comprising at least one of a packing material and a media such that the packing material and the media are located within the at least one outer pipe.

21. The biological treatment system of claim 1, wherein the drain field is a gravelless drain field assembly within which the at least one outer pipe is located.

22. A method of biological treatment comprising the steps of:
  (a) supplying effluent to at least one perforated distribution pipe;
  (b) discharging the effluent through the at least one perforated distribution pipe;
  (c) receiving the effluent in at least one perforated outer pipe surrounding the at least one distribution pipe and retaining the effluent therein for a period of time such that the effluent experiences biological treatment; and
  (d) passing the biologically treated effluent from the at least one perforated outer pipe to a wastewater drain field within which the at least one outer pipe is located.

23. The method of claim 22 further comprising the step of delivering gas to the at least one outer pipe to interact with the effluent.

24. The method of claim 23, further comprising the step of controlling at least one of: the effluent to the at least one outer pipe; the gas to the at least one outer pipe; and temperature of the effluent within the at least one outer pipe.

25. The method of claim 22, further comprising the step of delivering liquid to the at least one outer pipe to flush the at least one outer pipe.

26. A method of flushing a biological treatment system, comprising the steps of:
  (a) permanently positioning at least one perforated flushing pipe adapted to receive liquid within at least one outer pipe said outer pipe further having a distribution pipe for discharging effluent into said outer pipe and a gas delivery pipe for delivering gas to said outer pipe;
  (b) connecting a vacuum system to an end of the at least one outer pipe;
  (c) starting the vacuum system; and
  (d) supplying the liquid to the at least one flushing pipe such that the liquid is distributed within the at least one perforated flushing pipe and received by the outer pipe before being removed by the vacuum system.

27. A method of biological treatment comprising the steps of:
  (a) supplying effluent to at least one distribution pipe within an outer pipe positioned within a wastewater drain field;
  (b) delivering gas to the at least one outer pipe to interact with the effluent and retaining the effluent within the outer pipe such that the effluent experiences aerobic biological treatment; and
  (c) passing biologically treated effluent from the at least one outer pipe to the wastewater drain field.

28. The method of claim 27, further comprising the step of controlling at least one of: the effluent to the at least one distribution pipe; the gas to the at least one outer pipe; and temperature of the effluent within the outer pipe.

* * * * *